United States Patent
Dietz et al.

(10) Patent No.: US 9,372,588 B2
(45) Date of Patent: *Jun. 21, 2016

(54) PRESSURE-SENSITIVE MULTI-TOUCH DEVICE

(75) Inventors: Paul Dietz, Redmond, WA (US); John Lutian, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/111,611

(22) Filed: May 19, 2011

(65) Prior Publication Data

US 2012/0293448 A1 Nov. 22, 2012

(51) Int. Cl.
*G06F 3/045* (2006.01)
*G06F 3/047* (2006.01)

(52) U.S. Cl.
CPC .................................... *G06F 3/047* (2013.01)

(58) Field of Classification Search
None
See application file for complete search history.

(56) References Cited

U.S. PATENT DOCUMENTS

| | | | |
|---|---|---|---|
| 5,060,527 A | 10/1991 | Burgess | |
| 5,241,308 A | 8/1993 | Young | |
| 5,431,064 A | 7/1995 | Franz | |
| 5,543,588 A | 8/1996 | Bisset et al. | |
| 5,942,733 A | 8/1999 | Allen et al. | |
| 7,196,694 B2 | 3/2007 | Roberts | |
| 7,903,091 B2 | 3/2011 | Lee et al. | |
| 8,736,574 B2 * | 5/2014 | Dietz | G06F 3/0414 345/174 |
| 2001/0043189 A1 | 11/2001 | Brisebois et al. | |
| 2005/0259082 A1* | 11/2005 | Potsch | 345/173 |
| 2006/0102461 A1* | 5/2006 | Cok et al. | 200/512 |
| 2009/0256817 A1 | 10/2009 | Perlin et al. | |
| 2010/0006350 A1 | 1/2010 | Elias | |
| 2010/0037709 A1 | 2/2010 | Yeh et al. | |
| 2010/0090967 A1* | 4/2010 | Jang | 345/173 |
| 2010/0212974 A1 | 8/2010 | Kim | |
| 2011/0227836 A1* | 9/2011 | Li et al. | 345/173 |
| 2011/0291996 A1* | 12/2011 | Gao et al. | 345/177 |
| 2012/0087545 A1* | 4/2012 | Perlin et al. | 382/103 |

FOREIGN PATENT DOCUMENTS

| | | |
|---|---|---|
| CN | 101520697 A | 9/2009 |
| EP | 1106977 A2 | 6/2001 |
| JP | H02178620 A | 7/1990 |

(Continued)

OTHER PUBLICATIONS

"Touch User Interface—Touch Screen and Multi Touch", Retrieved at <<http://www.touchuserinterface.com/2009/06/pressure-sensitive-multi-touch-surfaces.html>>, Jun. 25, 2009, pp. 4.

(Continued)

*Primary Examiner* — Christopher R Lamb
(74) *Attorney, Agent, or Firm* — Brandon Roper; Judy Yee; Micky Minhas

(57) ABSTRACT

A pressure-sensitive multi-touch device is provided. The multi-touch device includes a matrix of pressure-sensitive cells, each pressure-sensitive cell configured to change a resistance of the cell inversely proportional to an amount of force applied to that cell. The multi-touch device further includes a force-spreading layer configured to diffuse a force of a touch input at a contact area to two or more pressure-sensitive cells within the matrix of pressure-sensitive cells.

16 Claims, 2 Drawing Sheets

(56) References Cited

FOREIGN PATENT DOCUMENTS

| | | |
|---|---|---|
| KR | 1020100084252 A | 7/2010 |
| KR | 1020110050043 A | 5/2011 |
| WO | 9718450 A1 | 5/1997 |
| WO | 2009123769 A1 | 10/2009 |
| WO | 2010074116 A1 | 7/2010 |
| WO | 2011006678 A1 | 1/2011 |
| WO | 2011115650 A2 | 9/2011 |
| WO | 2011149793 A1 | 12/2011 |
| WO | 2012050606 A2 | 4/2012 |

OTHER PUBLICATIONS

Will., "Pressure-sensitive capacitive touchscreens with multi-touch coming in 2010!", Retrieved at <<http://www.intomobile.com/2009/12/30/pressure-sensitive-capacitive-touchscreens-with-multi-touch-coming-in-2010/>>, Dec. 30, 2009, pp. 5.

"International Search Report", Mail Date: Dec. 26, 2012, Application No. PCT/US2012/038326, Filed date: May 17, 2012, pp. 8.

State Intellectual Property Office of the People's Republic of China, First Office Action Issued in Chinese Patent Application No. 201280024223.0, Aug. 26, 2015, 14 pages.

\* cited by examiner

PRESSURE-SENSITIVE MULTI-TOUCH DEVICE

BACKGROUND

Multi-touch devices may utilize various types of touch detection technology for detecting touch inputs, such as detecting electrical capacitance, detecting electrical resistance, optically detecting touches, etc. When a touch input is directed to the surface of the device, the touch input is detected and reported based on changes to the electrical capacitance, electrical resistance, or optical parameters of the device. However, it may be challenging to increase the resolution in such systems in a cost-effective manner without compromising responsiveness.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the disclosure, a pressure-sensitive multi-touch device is provided which is configured to detect locations of multiple touch inputs via pressure-sensitive cells organized within a matrix. The pressure-sensitive multi-touch device uses a force-spreading layer to diffuse the force of a touch input to two or more cells. Each such cell then changes in resistance inversely proportional to the amount of force applied to that cell, allowing for detection of the touch input.

DETAILED DESCRIPTION

Figure 1:
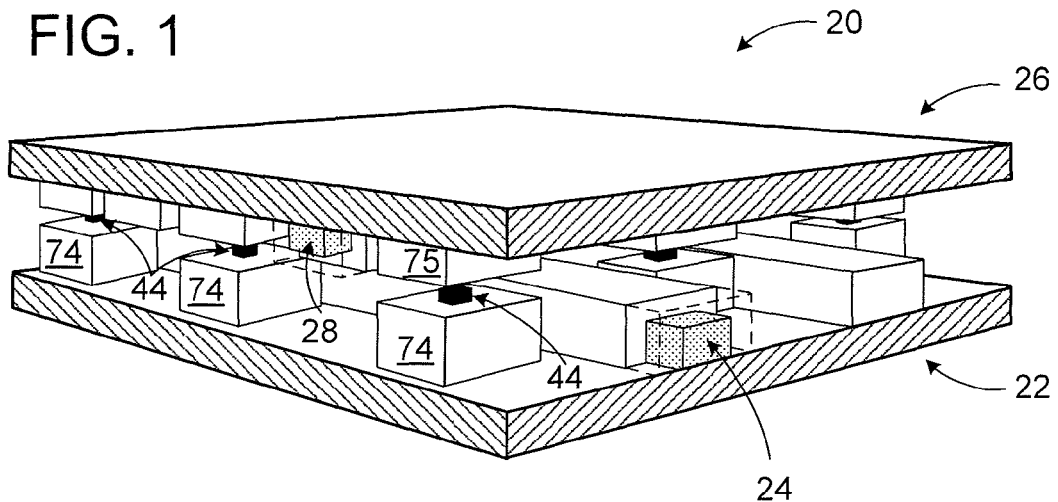
FIG. 1 shows a portion of an example matrix of pressure-sensitive cells of a pressure-sensitive multi-touch device in accordance with an embodiment of the present disclosure.

According to one aspect of the disclosure, a pressure-sensitive multi-touch device is provided which utilizes resistive detection for detecting the force of touch inputs on a surface of the multi-touch device. In particular, the multi-touch device includes a matrix of pressure-sensitive cells serving as touch sensors. A force-spreading layer positioned between the touch inputs and the cells allows for the force of a touch input at a particular contact area to be proportionally diffused across neighboring cells. The location of the contact area may then be interpolated from individual resistances measured at those cells. In this way, the position of a touch contact may be determined with a relatively higher resolution even though a relatively coarser matrix of sensors is employed.

Aspects of this disclosure will now be described by example and with reference to the illustrated embodiments. Components and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see. Furthermore, the size, shape, and deflections of the various layers of the multi-touch device are not intended to be technically precise, but rather to ease understanding.

FIG. 1 shows an example matrix 20 of pressure-sensitive cells utilized for multi-touch detection within a pressure-sensitive multi-touch device. Such a multi-touch device may be a peripheral input device (e.g., separate from a display), which is configured to receive multiple touch inputs, touch gestures, etc. Nonlimiting examples of a multi-touch device include a touchpad/trackpad, drawing tablet, etc. In some embodiments, the multi-touch device may be incorporated into a display device, such as a touch screen display.

Each cell within the matrix serves as a touch sensor which indicates a touch input responsive to force being applied to that cell. Thus, the cell is "pressure-sensitive" in that it responds to force applied within an area of the cell. As described in more detail hereafter, each pressure-sensitive cell within matrix 20 is configured to change a resistance of the cell inversely proportional to an amount of force applied to that cell and/or neighboring cells.

Matrix 20 may be configured in any suitable manner. In the example illustrated in FIG. 1, matrix 20 includes a first layer 22 including a plurality of column conductors 24. Matrix 20 further includes a second layer 26, opposing first layer 22, and including a plurality of row conductors 28. Further, second layer 26 may be flexible, and may locally and temporarily deform when force is applied. First layer 22 and second layer 26 may be any suitable material, such as a polyester film made from stretched polyethylene terephthalate (PET).

Column conductors 24 and row conductors 28 may be any suitable conductive material. As a nonlimiting example, column conductors 24 and row conductors 28 may be silver ink deposited (e.g., printed) on first layer 22 and second layer 26, respectively. It should be appreciated that FIG. 1 is illustrative, and not drawn to scale. Thus, column conductors 24 and row conductors 28 may have any suitable shape and size without departing from the scope of this disclosure.

Figure 2:
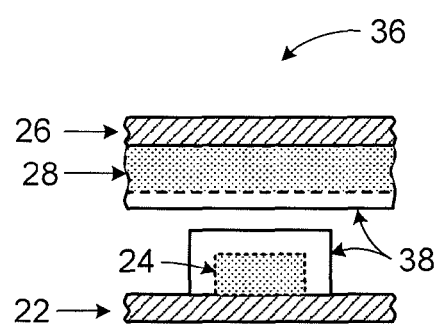
FIG. 2 shows a side view of an example pressure-sensitive cell of the matrix illustrated in FIG. 1.

Each intersection of a column conductor and a row conductor establishes a pressure-sensitive cell within matrix 20. FIG. 2 illustrates an example intersection of an example column conductor 24 of first layer 22 with an example row conductor 28 of second layer 26, which establishes an example cell 36.

Each pressure-sensitive cell within matrix 20 may be resistive, and may be configured to change its resistance inversely proportional to an amount of force applied to that cell. As a nonlimiting example, each cell may be highly resistive when no force is applied to the cell, and may decrease in resistance proportional to the amount of applied force. In such a case, sufficient force may decrease the resistance of the cell below a threshold amount, allowing for conductive elements within the cell (e.g., the portions of the intersecting conductors) to be electrically connected. Said another way, sufficient force may increase the conductance of the cell above a threshold amount, allowing for electrical connectivity between the intersecting conductors.

The pressure-sensitive cells within matrix 20 may be configured to respond to applied force by changing resistance in any suitable manner. In some embodiments, each cell may include force-sensitive resistive material that is configured to decrease in resistance proportional to the amount of applied force. More specifically, each cell may include force-sensitive resistive material between the portions of the intersecting column and row conductors. In the illustrated example, cell 36 includes force-sensitive resistive material 38 between a portion of column conductor 24 and a portion of row conductor 28.

Force-sensitive resistive material may be deposited over the entirety of each column conductor and each row conductor, or the force-sensitive resistive material may be focused at the intersections of the row conductors and column conductors (e.g., within the cells).

Further, force-sensitive resistive material may be adjacent to both the column and row conductors, as shown, or the force-sensitive resistive material may be present on only the column or row conductors. The term "column" may be used to refer to a column conductor and any force-sensitive resistive material on the column conductor, and the term "row" may be used to refer to a row conductor and any force-sensitive resistive material on the row conductor.

In some embodiments, it may be beneficial to keep the rows and columns electrically isolated from each other until a small threshold force level is exceeded. This may aid in reducing power consumption, and allow for rejection of sub-threshold forces caused by wind, vibration, or other forces not resulting from touches. This isolation can be accomplished by the use of spacers 44, which keep the rows and columns mechanically separated from each other.

Figure 3:
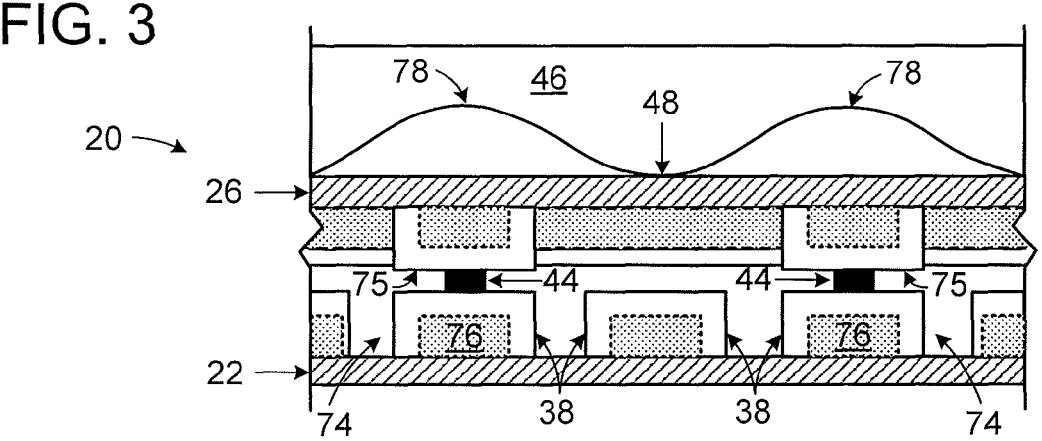
FIG. 3 shows a side view of a portion of an example pressure-sensitive multi-touch device including the matrix of FIG. 1.
Figure 4:
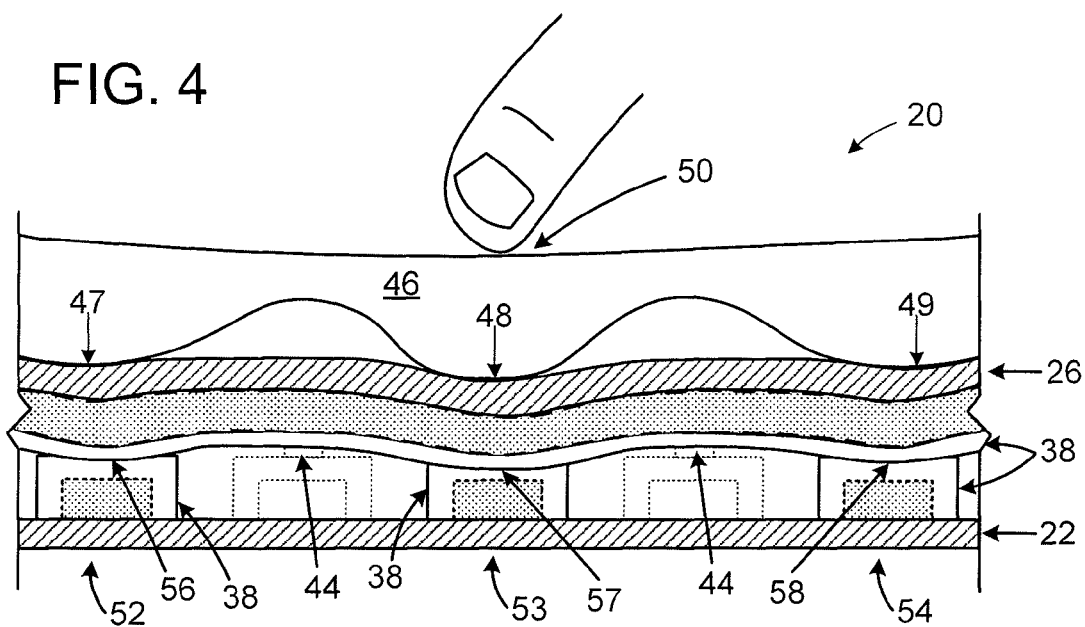
FIG. 4 shows an example touch input use scenario in accordance with an embodiment of the present disclosure.

As such, in some embodiments, matrix 20 may further include a plurality of spacers 44 configured to electrically isolate and mechanically separate first layer 22 from second layer 26 at each pressure-sensitive cell when no external force is applied to that cell. FIGS. 1, 3, and 4 illustrate example spacers 44. As a nonlimiting example, the spacers may be silicone. It should be appreciated that any suitable number of spacers and/or configuration of spacers may be utilized.

In some embodiments, the spacers may be positioned on islands 74 that may be constructed with an island conductor 76 and a force-sensitive resistive material analogous to the construction of the columns. Furthermore, lands 75 may be positioned opposite islands 74, and the lands may be constructed with a land conductor and a force-sensitive resistive material analogous to the construction of the rows. By using the same materials as for the columns and rows, the height of the islands may be consistent with the height of the columns, and the height of the lands may be consistent with the height of the rows. The island, land, and spacer may be collectively referred to as a spacer assembly.

It is generally desirable that only a small threshold force is needed to to overcome the separation provided by the spacers. However, in the course of manufacture, it is likely that the heights of the rows and columns will have some variation. For example, the heights of the column conductors 24, row conductors 28, and/or force-sensitive resistive material 38 may have minor variations. However, any variation likely will be small between nearby cells. Generally, the height of the conductors in a pressure-sensitive cell will be substantially equal to the height of the conductors in neighboring spacer assemblies, and the height of the force-sensitive resistive material in a pressure-sensitive cell will be substantially equal to the height of the force-sensitive resistive material in neighboring spacer assemblies.

The design of the spacers compensate for small variations and provide self-alignment. Each spacer 44 sits on a dummy island 74, which is similar to the design of the sensor site. Similarly, there is a land 75 for the sensor designed to mimic the height of the other side of the sensor. The spacer itself can be built on either the top or bottom structure. The result is that as long as the spacer is larger than the local height variation, separation between the row and column is assured in the absence of an external applied force. The spacing will thus be largely determined by the spacer height, independent of the local sensor thicknesses. Such an arrangement helps maintain a small, consistent, activation threshold.

Returning to FIG. 1, matrix 20 is configured such that at each cell, the intersecting column and row conductors are not in direct contact, but rather, are separated by the space established by the spacers and/or the force-sensitive resistive material. As such, when no force is applied to the matrix, the separation and/or the force-sensitive resistive material provides resistance between column conductors 24 and row conductors 28 at each intersection (e.g., reducing conductivity at each cell). However, when force is applied to the matrix, the force-sensitive resistive material within cells proximal to the force respond by decreasing in resistance, establishing electrical connectivity between the column conductor and row conductor at that cell. As such, a resistance and/or conductance measured for a respective column to a respective row serves as an indication of the amount of force applied to that cell. The pressure-sensitive cells within matrix 20 serve as touch sensors. Responsive to force, second layer 26 locally deforms between the spacers, allowing conductors 28 of second layer 26 to make electrical contact with conductors 24 first layer 22, as described by way of example with reference to FIG. 4.

In addition to matrix 20, a touch-sensitive multi-touch device may further include a force-spreading layer 46, as illustrated in FIG. 3. Force-spreading layer 46 is configured to diffuse a force of a touch input at a contact area to two or more pressure-sensitive cells within matrix 20.

In some embodiments, force-spreading layer 46 may be configured to diffuse the force as a function of distance from the contact area of the touch input. As a nonlimiting example, force-spreading layer 46 may diffuse more force to pressure-sensitive cells proximal to the contact area (e.g., one cell away) and to diffuse less force to pressure-sensitive cells farther from the contact area. In this way, force-spreading layer 46 locally diffuses the touch input to a neighborhood of cells proximal to the contact area.

Force-spreading layer 46 may be configured in any suitable manner. In some embodiments, force-spreading layer 46 may include a plurality of bumps 48. As a nonlimiting example, the force-spreading layer may be an elastomeric sheet with bumps molded into the sheet. Bumps 48 may be located on the side of force-spreading layer 46 which is proximal to second layer 26. As such, force applied to force-spreading layer 46 may be transferred to second layer 26 via bumps 48. However, in other embodiments, force-spreading layer 46 may be positioned proximal to first layer 22.

Each bump of bumps 48 may be sized and shaped to close a different pressure-sensitive cell responsive to a force applied to a contact area proximate to the bump. A touch contact can cause two or more such bumps to close their respective pressure sensitive cells. In other words, the force of a touch input is diffused such that first layer 22 electrically and mechanically contacts second layer 26 at intersections associated with two or more cells. Each cell responds to the applied force by inversely proportionally changing in resistance, thus "closing" the cell.

Further, bumps 48 may be positioned in any suitable configuration. In some embodiments, bumps 48 may be aligned with cell locations of matrix 20 of pressure-sensitive cells. In particular, each bump may include an extension that projects towards a cell of matrix 20. The bump projects to an area between surrounding islands and spacers. As such, the force-spreading layer may have troughs 78 between the bumps, and such troughs may be aligned with the islands and spacers.

FIG. 4 illustrates an example use scenario of receiving a touch input at the portion of the pressure-sensitive multi-touch device illustrated in FIG. 3. In this example, a touch input is received at a contact area 50. Prior to the touch input, spacers 44 serve to separate first layer 22 from second layer 26. As shown in FIG. 4, in order to bring the row and column into contact, force is applied to force-spreading layer 46. In response, force-spreading layer 46 locally deforms, transferring the force of the touch input to cells 52, 53, and 54 of matrix 20. More specifically, the force is diffused such that the force-sensitive resistive material 38 of second layer 26 within cells 52, 53, and 54 deforms, contacting the force-sensitive resistive material 38 of first layer 22 within cells 52, 53, and 54, as illustrated at 56, 57, and 58, respectively. In each of cells 52, 53, and 54, the force-sensitive resistive material 38 within the cell responds to the force by decreasing in resistance, allowing the row conductor of second layer 26 to establish electrical connectivity with the column conductor of first layer 22. As such, the touch input closes cells 52, 53, and 54, and a touch is registered.

In FIG. 4, touch input is received at a contact area 50 that is substantially above cell 53. As a result, the bump 48 of force-spreading layer 46 is depressed into the cell 53 and causes cell 53 to close. Furthermore, neighboring bump 47 and neighboring bump 49 of the force-spreading layer 46 are also depressed into cell 52 and cell 54, respectively.

Since force-spreading layer 46 diffuses the force of a touch input to two or more pressure-sensitive cells, the location of the contact area of the touch input may be interpolated from a resistance measured at the two or more cells. As such, the location may be determined with a relatively higher resolution than utilized in traditional systems. For example, whereas traditional systems may register a touch input from a pointed object such as a stylus at only one sensor, the pressure-sensitive multi-touch device as described herein is configured to register such a touch at least at two cells, thus allowing for the position of the touch to be more accurately determined via interpolation from the two or more measurements.

Further, the herein-described pressure-sensitive multi-touch device allows for increased resolution in touch detection even though the spacing of the pressure-sensitive cells within matrix 20 may be relatively coarser than a matrix of sensors utilized in traditional systems. Since a linear increase in resolution may lead to a quadratic increase in the number of sensors, a coarse matrix of sensors, such as matrix 20 of pressure-sensitive cells, provides a cost-effective alternative for increasing touch sensitivity without increasing the number of sensors. Further, by not increasing the number of sensors and circuitry, increase in data communication and interpretation times typically associated with the additional sensors may be avoided. Further yet, force-spreading layer 46 diffuses the force while maintaining sufficient touch sensitivity, such that a user need not apply more force as commonly done with traditional systems having a larger number of touch sensors.

Such interpolation may be performed in any suitable manner. For example, in addition to matrix 20 and force-spreading layer 46, the pressure-sensitive multi-touch device may further include a logic subsystem configured to execute stored instructions for performing such interpolation.

While a through-mode arrangement has been used above to highlight the utility of the disclosed force-spreading layer and self-alligning spacer assemblies, it should be understood that such an arrangement is not required. For example, the force-spreading layer and/or self aligning spacers may be used in a shunt mode that does not employ the column and row conductors described above.

A device configured to utilize a shunt mode instead includes, on one side of each pressure-sensitive cell, a pair of electrically separated conductors. A force-sensitive material is aligned with the pair of conductors on an opposite side. When no external force is applied, the conductors are not electrically connected. When an external force is a applied, the force-sensitive resistive material comes into contact with both conductors and forms an electrical connection therebetween. Because the resistance of the force-sensitive resistive material drops as the amount of applied force increases, the conductance between the pair of conductors increases in proportion to the applied force. As such, the resistance and/or conductance between the pair of conductors can be used to measure force applied at the cell site.

In some embodiments, the above described methods and processes may be tied to a computing system including one or more computers. In particular, the methods and processes described herein may be implemented as a computer application, computer service, computer API, computer library, and/or other computer program product.

Figure 5:
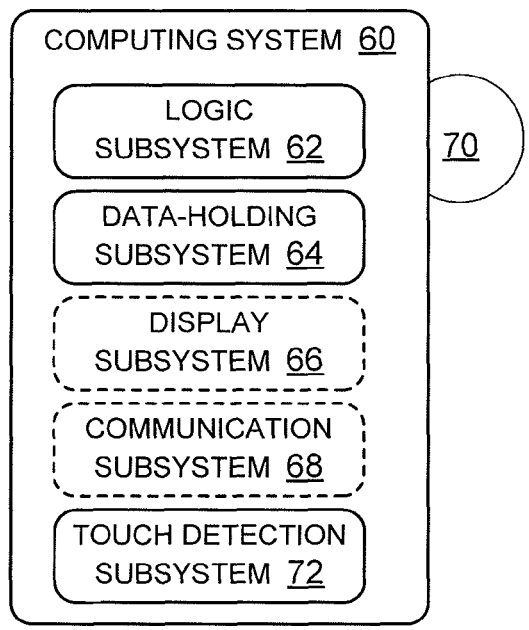
FIG. 5 schematically shows an example computing system in accordance with an embodiment of the present disclosure.

FIG. 5 schematically shows a nonlimiting computing system 60 that may perform one or more of the above described methods and processes. Computing system 60 is shown in simplified form. It is to be understood that virtually any computer architecture may be used without departing from the scope of this disclosure. In some embodiments, computing system 60 may take the form of a peripheral multi-touch device or a computing system including a multi-touch device.

Computing system 60 includes a logic subsystem 62 and a data-holding subsystem 64. Computing system 60 may optionally include a display subsystem 66, communication subsystem 68, and/or other components not shown in FIG. 5. Computing system 60 may also optionally include other user input devices such as keyboards, mice, game controllers, cameras, and/or microphones, for example.

Logic subsystem 62 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 64 may include one or more physical, non-transitory, devices configured to hold data and/or instructions executable by the logic subsystem to implement the herein described methods and processes. When such methods and processes are implemented, the state of data-holding subsystem 64 may be transformed (e.g., to hold different data).

Data-holding subsystem 64 may include removable media and/or built-in devices. Data-holding subsystem 64 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 64 may include devices with one or more of the following characteristics: volatile, nonvolatile, dynamic, static, read/write, read-only, random access, sequential access, location addressable, file addressable, and content addressable. In some embodiments, logic subsystem 62 and data-holding subsystem 64 may be integrated into one or more common devices, such as an application specific integrated circuit or a system on a chip.

FIG. 5 also shows an aspect of the data-holding subsystem in the form of removable computer-readable storage media 70, which may be used to store and/or transfer data and/or instructions executable to implement the herein described methods and processes. Removable computer-readable storage media 70 may take the form of CDs, DVDs, HD-DVDs, Blu-Ray Discs, EEPROMs, and/or floppy disks, among others.

It is to be appreciated that data-holding subsystem 64 includes one or more physical, non-transitory devices (i.e., storage media). In contrast, in some embodiments aspects of the instructions described herein may be propagated in a transitory fashion by a pure signal (e.g., an electromagnetic signal, an optical signal, etc.) that is not held by a physical device for at least a finite duration (e.g., communication signal). Furthermore, data and/or other forms of information pertaining to the present disclosure may be propagated by a pure signal.

When included, display subsystem 66 may be used to present a visual representation of data held by data-holding subsystem 64. As the herein described methods and processes change the data held by the data-holding subsystem, and thus transform the state of the data-holding subsystem, the state of display subsystem 66 may likewise be transformed to visually represent changes in the underlying data. Display subsystem 66 may include one or more display devices utilizing virtually any type of technology. Such display devices may be combined with logic subsystem 62 and/or data-holding subsystem 64 in a shared enclosure, or such display devices may be peripheral display devices.

When included, communication subsystem 68 may be configured to communicatively couple computing system 60 with one or more other computing devices. Communication subsystem 68 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 60 to send and/or receive messages to and/or from other devices via a network such as the Internet.

Computing system 60 may further include a touch detection subsystem 72 configured to provide the herein-described touch detection. Touch detection subsystem 72 may be configured to measure the resistance of pressure-sensitive cells within the matrix. For example, touch detection subsystem 72 may selectively scan known voltages to the row conductors and column conductors so that the various cells can be isolated and measured. As a nonlimiting example, a non-zero voltage differential may be applied across one cell while the voltage differential is zeroed out at all other cells. In this way, the current through that cell may be measured, and the resistance of that cell can be calculated.

Touch detection subsystem 72 may be further configured to operate with logic subsystem 62 to execute instructions stored on data-holding subsystem 64 for interpolating a location of the contact area from a resistance measured at the two or more pressure-sensitive cells to which the force of the touch input was diffused. Such interpolation may be performed using a linear or nonlinear interpolation function or functions.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A pressure-sensitive multi-touch device responsive to touch pressure from one or more touch inputs, the multi-touch device comprising:
a series of row conductors arranged on a first layer;
a series of column conductors arranged on a second layer, the series of column conductors opposing and intersecting the series of row conductors to form, at each intersection of row and column conductors, a pressure-sensitive cell, an electrical resistance of each cell inversely related to a force applied to that cell;
materially distinct from the row and column conductors, a series of insulating spacers arranged between the first layer and the second layer to electrically isolate row and column conductors at each intersection to which no touch force is applied, the spacers coupled between dummy islands of the first layer, equal in height to the row conductors, and opposing lands of the second layer, equal in height to the column conductors; and
an elastomeric force-spreading sheet including a flat side and a plurality of bumps opposite the flat side, each bump aligned with a different pressure-sensitive cell and sized and shaped to diffuse the touch force, directed toward the flat side, to two or more of the pressure-sensitive cells.

2. The pressure-sensitive multi-touch device of claim 1, wherein each pressure-sensitive cell is configured to exhibit a decrease in electrical resistance in proportion to the amount of force applied to that cell.

3. The pressure-sensitive multi-touch device of claim 2, wherein each pressure-sensitive cell comprises force-sensitive resistive material deposited on a conductor.

4. The pressure-sensitive multi-touch device of claim 1, wherein each pressure-sensitive cell further comprises force-sensitive resistive material between the column conductor and the row conductor of a given intersection, the force-sensitive resistive material deposited on one or both of the column conductor and the row conductor.

5. The pressure-sensitive multi-touch device of claim 4, wherein the force-sensitive resistive material of each pressure-sensitive cell is configured to exhibit a decrease in electrical resistance in proportion to the amount of force applied to that cell.

6. The pressure-sensitive multi-touch device of claim 1, wherein the plurality of bumps are aligned with cell locations of the matrix of pressure-sensitive cells.

7. The pressure-sensitive multi-touch device of claim 1, wherein the elastomeric force-spreading sheet is configured to diffuse the touch force to two or more pressure-sensitive cells in proportion to the touch force.

8. The pressure-sensitive multi-touch device of claim 1, further comprising:
   a logic subsystem configured to execute instructions; and
   a data-holding subsystem holding instructions executable by the logic subsystem to interpolate a location of a contact area of a given touch input from an electrical resistance measured at two or more pressure-sensitive cells.

9. The pressure-sensitive multi-touch device of claim 1, wherein the force-spreading sheet is a continuous sheet.

10. The pressure-sensitive multi-touch device of claim 1 wherein the electrical resistance of each cell in the matrix is inversely proportional to the amount of force applied to that cell.

11. A pressure-sensitive multi-touch device configured to detect one or more touch inputs, the multi-touch device comprising:
   a matrix of pressure-sensitive cells, including:
      a first layer supporting a series of row conductors;
      a second layer supporting a series of column conductors, the row conductors opposing and intersecting the column conductors,
      force-sensitive resistive material arranged between the row and column conductors at each intersection of a row conductor and a column conductor, the force-sensitive resistive material leaving a gap between the row conductor and the column conductor in absence of applied force, the force-sensitive resistive material decreasing in resistance with increasing force applied to that intersection;
      materially distinct from the row and column conductors, a series of insulating spacers arranged between the first layer and the second layer to electrically isolate row and column conductors at each intersection to which no touch force is applied; and
   an elastomeric force-spreading sheet including a flat side opposite a curved side having a series of peaks and troughs, each trough aligned with a different insulating spacerpeak aligned with a different pressure-sensitive cell, each peak being sized and shaped to diffuse a force of a touch input directed toward the flat side to two or more pressure-sensitive cells within the matrix of pressure-sensitive cells.

12. The pressure-sensitive multi-touch device of claim 11, wherein the plurality of bumps are aligned with cell locations of the matrix of pressure-sensitive cells.

13. The pressure-sensitive multi-touch device of claim 11, wherein the elastomeric force-spreading sheet is configured to diffuse the force of the touch input to two or more pressure-sensitive cells proportional to an amount of the force of the touch input.

14. The pressure-sensitive multi-touch device of claim 13, wherein the force-spreading sheet is configured to diffuse the force as a function of distance from a contact area of the touch input.

15. The pressure-sensitive multi-touch device of claim 14, wherein the force-spreading sheet is configured to diffuse more force to pressure-sensitive cells proximal to the contact area and to diffuse less force to pressure-sensitive cells farther from the contact area.

16. A pressure-sensitive multi-touch device responsive to touch pressure from one or more touch inputs, the multi-touch device comprising:
   a series of row conductors arranged on a first layer;
   a series of column conductors arranged on a second layer, the series of column conductors opposing and intersecting the series of row conductors to form, at each intersection of row and column conductors, a pressure-sensitive cell;
   force-sensitive resistive material arranged between a portion of each column conductor and an intersecting portion of each row conductor, the force-sensitive resistive material decreasing in electrical resistance in proportion to a force applied to each cell;
   materially distinct from the row and column conductors, a series of insulating spacers arranged between the first layer and the second layer to electrically isolate row and column conductors at each intersection to which no touch force is applied;
   a continuously elastomeric force-spreading sheet including a flat side opposite a curved side having a series of equally wide rounded peaks and rounded troughs, each peak aligned with a different pressure-sensitive cell and sized and shaped to diffuse a touch force directed toward the flat side to two or more of the pressure-sensitive cells;
   a logic subsystem configured to execute instructions; and
   a data-holding subsystem holding instructions executable by the logic subsystem to interpolate a location of a contact area of a given touch input from the electrical resistance measured at the two or more pressure-sensitive cells.

* * * * *